US012613954B2

(12) United States Patent
Sumedrea et al.

(10) Patent No.: US 12,613,954 B2
(45) Date of Patent: Apr. 28, 2026

(54) ADAPTERS FOR RUNTIME APPLICATION SELF-PROTECTION

(71) Applicant: CrowdStrike, Inc., Sunnyvale, CA (US)

(72) Inventors: Paul Sumedrea, Bucharest (RO); Cristian Viorel Popa, Bucharest (RO); Dragos Corlatescu, Ploiesti (RO); Vasile-Daniel Sava, Vaslui (RO)

(73) Assignee: CrowdStrike, Inc., Sunnyvale, CA (US)

( * ) Notice: Subject to any disclaimer, the term of this patent is extended or adjusted under 35 U.S.C. 154(b) by 146 days.

(21) Appl. No.: 18/494,509

(22) Filed: Oct. 25, 2023

(65) Prior Publication Data

US 2025/0139233 A1     May 1, 2025

(51) Int. Cl.
G06F 21/55 (2013.01)
G06F 21/00 (2013.01)

(52) U.S. Cl.
CPC .................................... G06F 21/55 (2013.01)

(58) Field of Classification Search
CPC ........ G06F 21/55; G06F 21/50; G06F 21/552; G06F 21/554; G06F 21/56; G06F 21/566; G06F 21/57; G06F 21/577
See application file for complete search history.

(56) References Cited

U.S. PATENT DOCUMENTS

| | | | |
|---|---|---|---|
| 2019/0042745 A1 | 2/2019 | Chen et al. | |
| 2020/0026849 A1 | 1/2020 | Levin et al. | |
| 2020/0076842 A1* | 3/2020 | Zhou ...................... | G06N 3/045 |
| 2021/0012239 A1* | 1/2021 | Arzani ................... | H04L 43/50 |
| 2021/0014256 A1* | 1/2021 | Malhotra ............ | H04L 63/1433 |
| 2023/0195828 A1* | 6/2023 | Huang ................. | G06F 16/906 |
| | | | 707/738 |

OTHER PUBLICATIONS

Extended European Search Report Dated Feb. 10, 2025 for European Patent Application No. 24197515.0, 6 pages total.

* cited by examiner

*Primary Examiner* — Edward Zee
(74) *Attorney, Agent, or Firm* — Womble Bond Dickinson (US) LLP

(57) ABSTRACT

An approach is provided that trains an artificial intelligence model (AIM) using training data to produce a generalized AIM, wherein the training data comprises log-collected data corresponding to multiple application types and the generalized AIM is trained to detect one or more cross-platform cybersecurity threats. The approach identifies multiple application-specific training data sets, wherein each one of the application-specific training data sets includes labeled application logs corresponding to one of the multiple application types. The approach then fine-tunes the generalized AIM using the multiple application-specific training data sets to produce multiple dedicated AIMs, wherein each one of the dedicated AIMs is trained to detect one or more application-centric cybersecurity threats targeted at a corresponding one of the application types.

17 Claims, 6 Drawing Sheets

400 ➔

Training an artificial intelligence model (AIM) using training data to produce a generalized AIM, wherein the training data comprises log-collected data corresponding to a plurality of application types and the generalized AIM is trained to detect one or more cross-platform cybersecurity threats
410

Identifying a plurality of application-specific training data sets, wherein each one of the plurality of application-specific training data comprises labeled application logs corresponding to one application type from the plurality of application types
420

Fine-tuning the generalized AIM using the plurality of application-specific training data sets to produce a plurality of dedicated AIMs, wherein each one of the dedicated AIMs from the plurality of dedicated AIMs is trained to detect one or more application-centric cybersecurity threats targeted at a corresponding one of the plurality of application types
430

200 ⟶

240 ⟶

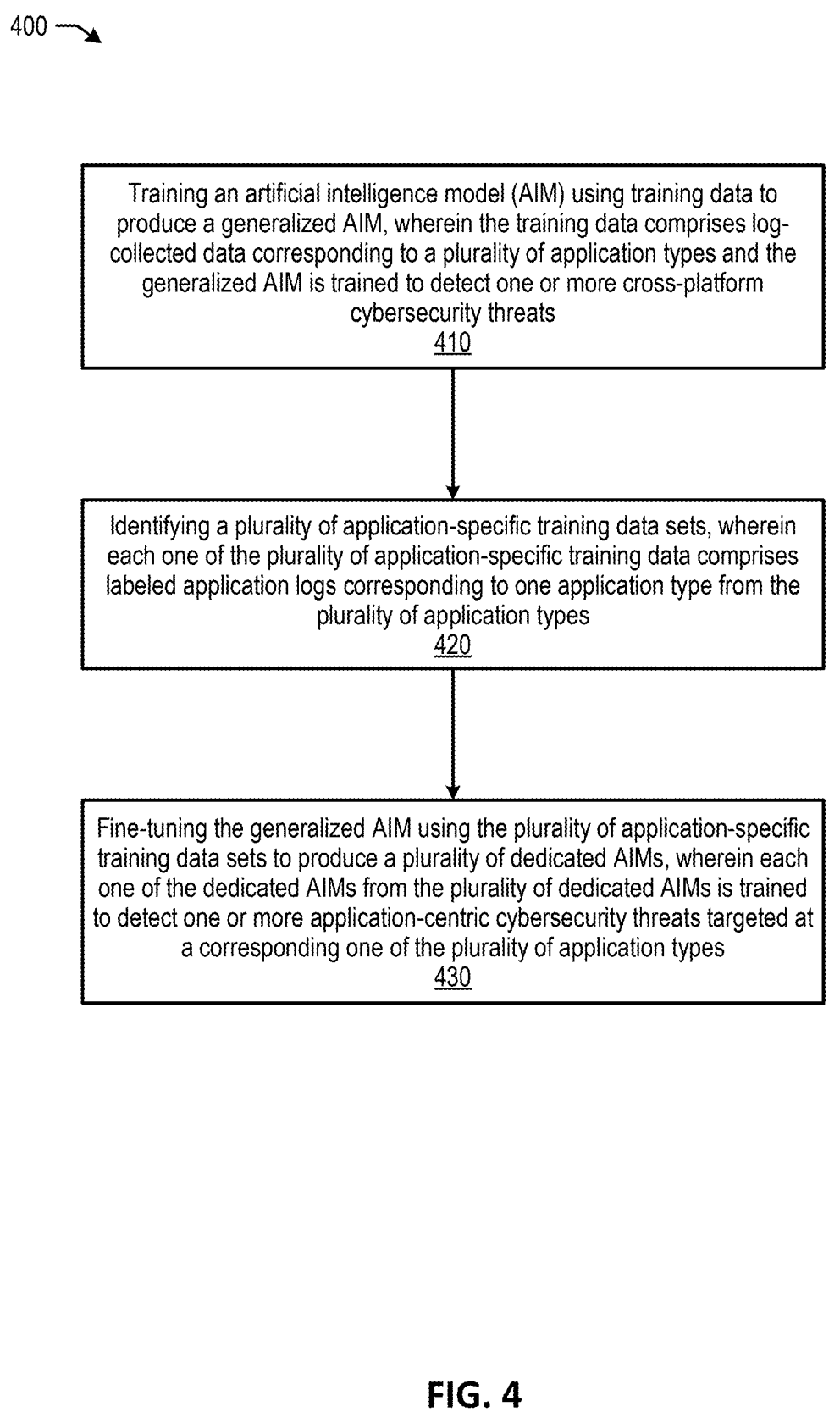

400 ⟶

Training an artificial intelligence model (AIM) using training data to produce a generalized AIM, wherein the training data comprises log-collected data corresponding to a plurality of application types and the generalized AIM is trained to detect one or more cross-platform cybersecurity threats
410

Identifying a plurality of application-specific training data sets, wherein each one of the plurality of application-specific training data comprises labeled application logs corresponding to one application type from the plurality of application types
420

Fine-tuning the generalized AIM using the plurality of application-specific training data sets to produce a plurality of dedicated AIMs, wherein each one of the dedicated AIMs from the plurality of dedicated AIMs is trained to detect one or more application-centric cybersecurity threats targeted at a corresponding one of the plurality of application types
430

FIG. 4

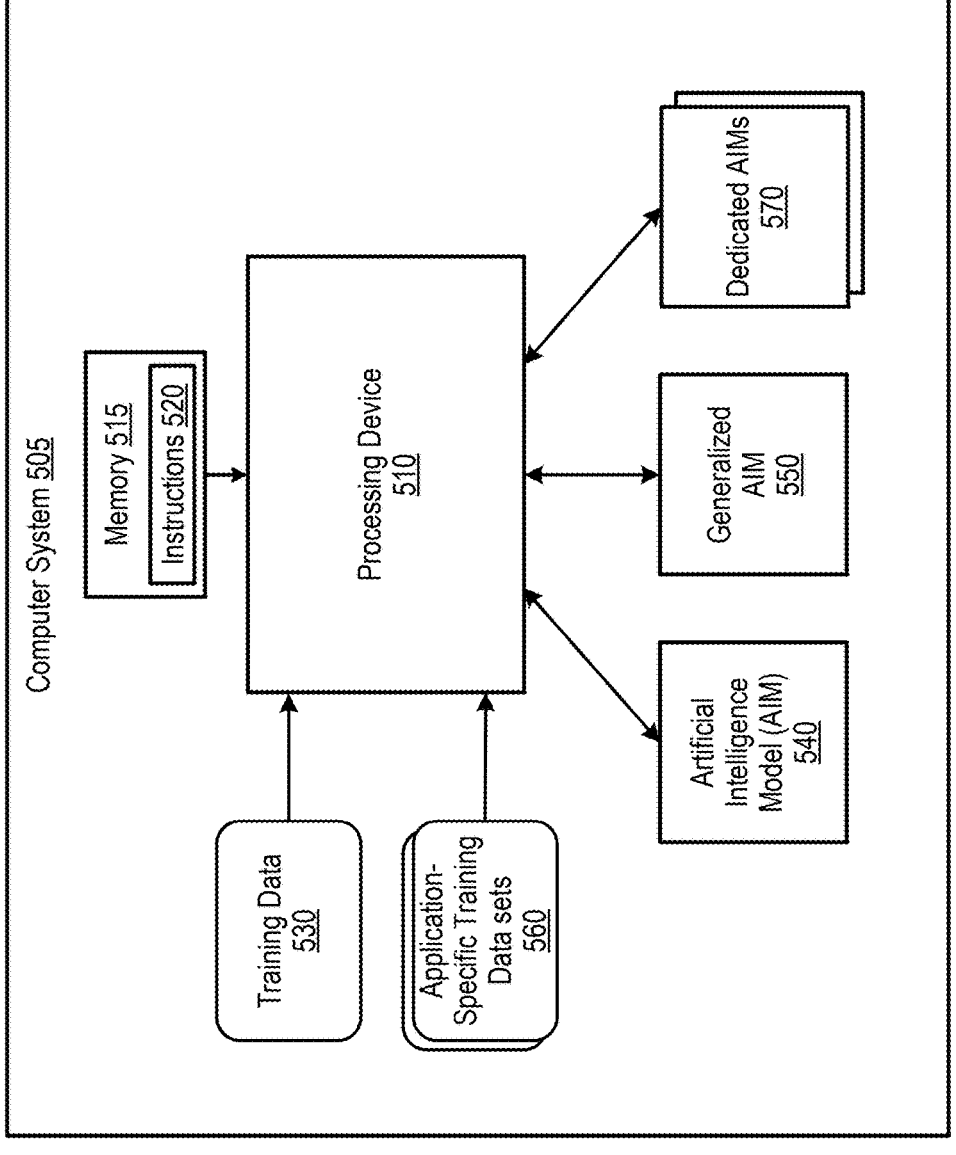
FIG. 5

ADAPTERS FOR RUNTIME APPLICATION SELF-PROTECTION

TECHNICAL FIELD

Aspects of the present disclosure relate to protecting applications from vulnerabilities, and more particularly, to efficiently producing and utilizing dedicated artificial intelligence models for runtime application self-protection.

BACKGROUND

Software applications harbor vulnerabilities that may be exploited by malicious actors to initiate or exacerbate cybersecurity threats. Malicious actors, such as hackers and cybercriminals, actively seek out these vulnerabilities to compromise applications for financial gain, data theft, espionage, or disruption of services. The malicious actors may exploit weaknesses in the software application to gain unauthorized access, execute arbitrary code, manipulate data, or even take control of entire systems. Additionally, the interconnected nature of modern applications, often relying on third-party libraries and APIs, introduces another layer of risk because flaws in the external components can have a cascading effect, allowing attackers to indirectly exploit a main software application.

Cybersecurity threats encompass a wide range of activities and actions that pose risks to the confidentiality, integrity, and availability of computer systems and data. These threats can include malicious activities such as viruses, ransomware, and hacking attempts aimed at exploiting vulnerabilities in software or hardware. Additionally, cybersecurity threats also encompass suspicious activities, such as unusual patterns of network traffic or unauthorized access attempts, which may indicate potential security breaches or weaknesses that need investigation and mitigation.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 4 is a flow diagram of a method for performing a two-stage training operation on an AIM to produce dedicated AIMs, in accordance with some embodiments of the present disclosure.

FIG. 5 is a is a block diagram that illustrates an example system for performing a two-stage training operation on an AIM to produce dedicated AIMs, in accordance with some embodiments of the present disclosure.

DETAILED DESCRIPTION

Figure 1:
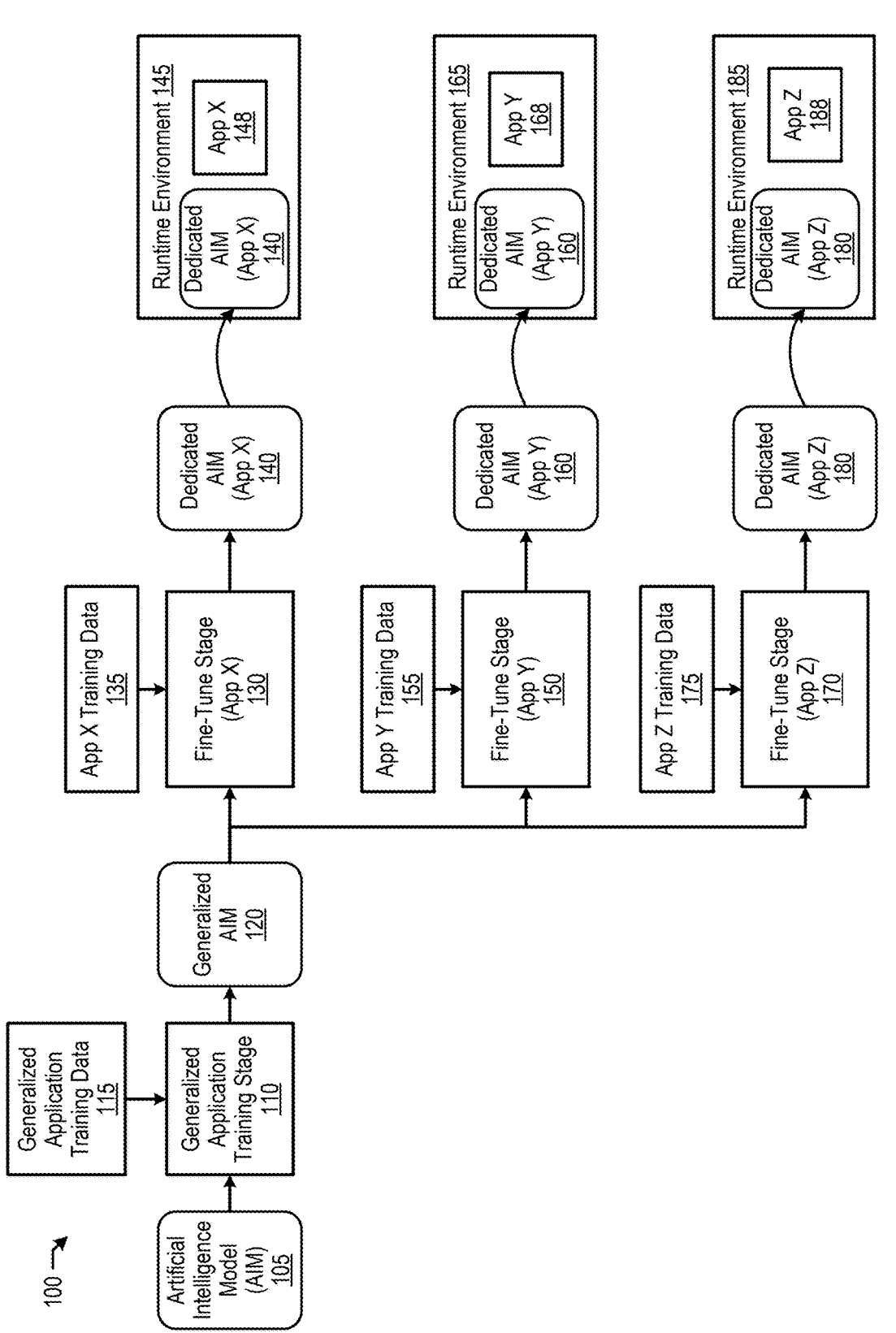
FIG. 1 is a block diagram that illustrates an example system that performs a two-stage training approach to produce dedicated artificial intelligence models for software applications, in accordance with some embodiments of the present disclosure.

Artificial intelligence (AI) is a field of computer science that encompasses the development of systems capable of performing tasks that typically require human intelligence. Machine learning is a branch of artificial intelligence focused on developing algorithms and models that allow computers to learn from data and make predictions or decisions without being explicitly programmed. Machine learning models are the foundational building blocks of machine learning, representing the mathematical and computational frameworks used to extract patterns and insights from data. Large language models, a specialized category within machine learning models, are trained on vast amounts of text data to capture the nuances of language and context. By combining advanced machine learning techniques with enormous datasets, large language models harness data-driven approaches to achieve sophisticated language understanding and generation capabilities. As discussed herein, artificial intelligence models, or AI models, include machine learning models, large language models, and other types of models that are based on neural networks, genetic algorithms, expert systems, Bayesian networks, reinforcement learning, decision trees, or combination thereof.

As discussed above, software applications harbor vulnerabilities that may be exploited by malicious actors to initiate or exacerbate cybersecurity threats. Runtime Application Self-Protection (RASP) is a cybersecurity approach that focuses on safeguarding applications during their execution. Each existing RASP solution is designed for a single software application. However, a challenge found is that creating a RASP solution is a complex endeavor that demands a careful consideration of both the application's intricacies and the processing resources required. RASP solution development requires a substantial amount of resources and involves integrating monitoring and analysis capabilities directly into the application's runtime environment, which requires a deep understanding of the application's underlying architecture, data flows, and potential security vulnerabilities.

The present disclosure addresses the above-noted and other deficiencies by providing an approach that trains an artificial intelligence model (AIM) using training data to produce a generalized AIM. The training data comprises log-collected data corresponding to a plurality of application types and the generalized AIM is trained to detect one or more cross-platform cybersecurity threats. In some embodiments, the approach identifies a plurality of application-specific training data sets, wherein each one of the plurality of application-specific training data sets comprises labeled application logs corresponding to one application type from the plurality of application types. The approach then fine-tunes the generalized AIM using the plurality of application-specific training data sets to produce a plurality of dedicated AIMs, wherein each one of the dedicated AIMs from the plurality of dedicated AIMs is trained to detect one or more application-centric cybersecurity threats targeted at a corresponding one of the plurality of application types.

In some embodiments, the approach intercepts a request targeted to a first application from an external entity, wherein the first application is a first application type. The approach determines, by the dedicated AIM, whether the request indicates at least one of the application-centric cybersecurity threats. The approach then quarantines the external entity responsive to determining that the request indicates at least one of the one or more application-centric cybersecurity threats.

In some embodiments, in response to determining that the request is devoid of the application-centric cybersecurity threat, the approach forwards the request to the application. The approach intercepts a response from the application that is responding to the request, and determines, by the dedicated AIM, whether the response indicates the application-centric cybersecurity threat. The approach quarantines the external entity and the application in response to determining that the response indicates the application-centric cybersecurity threat.

In some embodiments, in response to determining that the request is devoid of the application-centric cybersecurity threat, the approach forwards the request to the application. The approach receives a debug log from the application responsive to forwarding the request to the application. The approach determines, by the dedicated AIM, whether the debug log indicates the application-centric cybersecurity threat. The approach quarantines the external entity and the application in response to determining that the debug log indicates the application-centric cybersecurity threat.

In some embodiments, the plurality of application types include a second application type, and the plurality of dedicated AIM's include a second dedicated AIM that is trained to detect the one or more application-centric cybersecurity threats targeted at the second application type. In some embodiments, the first dedicated AIM is not trained to detect the one or more application-centric cybersecurity threats targeted at the second application type.

In some embodiments, the one or more cross-platform cybersecurity threats are enabled to infect at least two of the plurality of application types, and each one of the one or more application-centric cybersecurity threats are enabled to infect a single one of the plurality of application types.

In some embodiments, the approach generates a prompt comprising first application-specific training data set. Responsive to inputting the prompt into the generalized AIM, the approach adds one or more layers to the generalized AIM to produce a first dedicated AIM from the plurality of dedicated AIMs.

As discussed herein, the present disclosure provides an approach that improves the operation of a computer system by providing dedicated AIMs that monitor software application inputs, outputs, and debug logs to prevent malicious actors from exposing vulnerabilities in the software applications. In addition, the present disclosure provides an improvement to the technological field of software application protection by providing a time savings and resource savings approach to creating multiple dedicated AIMs for cybersecurity threat detection of multiple software applications.

FIG. 1 is a block diagram that illustrates an example system that performs a two-stage training approach to produce dedicated artificial intelligence models for software applications, in accordance with some embodiments of the present disclosure. System 100 provides a two-stage artificial intelligence model (AIM) training approach that produces dedicated AIMs to protect particular applications from cybersecurity threats. Cybersecurity threats encompass both malicious activities (e.g., hacking, malware, phishing) and suspicious activities (e.g., unusual network traffic, unauthorized access attempts) related to software and computer systems.

System 100 includes a generalized application training stage 110 and fine-tuning (e.g., dedicated) application training stages 130, 150, and 170. General application training stage 110 trains AIM 105 using generalized application training data 115 in a self-supervised manner. AIM 105 learns general application context by analyzing logs from various types of applications (incoming/outgoing requests/responses to/from databases, APIs, etc.). The logs may include requests designed to force certain application behavior (e.g., through prompt injection) (see FIG. 2A and corresponding text for further details). General application training stage 110 produces generalized AIM 120, which is trained to detect cross-platform cybersecurity threats. Cross-platform cybersecurity threats are enabled to infect multiple types of applications. For example, over a computer network a computer system may be targeted by malware or ransomware (either delivered after accessing a domain with a bad reputation or downloaded from a suspicious URL). These malicious payloads can also be delivered via phishing attacks. Other examples of cross-platform cybersecurity threats include distributed denial of service attacks or persistent communication with a command and control (C2) domain where data can be exfiltrated by attackers.

The next stage involves fine-tuning generalized AIM 120 based particular application-specific training data sets. In the fine-tuning stage, generalized AIM 120 is trained to protect a particular application (or group of similar applications) using a narrower dataset particular to the applications. The fine-tuning stage refines generalized AIM 120's capabilities, adapting it to perform tasks such as language translation, question answering, or text completion. The fine-tuning stage involves iteratively adjusting the model's parameters, utilizing advanced optimization techniques to minimize prediction errors and improve its ability to generate coherent and contextually relevant text. In some embodiments, the fine-tuning process adds adapter layers to generalized AIM 120 to produce dedicated AIMs (see FIG. 2B and corresponding text for further details).

FIG. 1 shows that system 100 uses fine tine training stage 130, fine-tuning stage 150, and fine-tuning stage 170 to produce three dedicated AIMs 140, 160, and 180 from generalized AIM 120. System 100 may efficiently generate more or less dedicated AIMs from generalized AIM 120 than what is shown in FIG. 1.

Fine-tuning stage 130 trains generalized AIM 120 using application X training data 135 (e.g., application-specific training data set X) to produce dedicated AIM 140. Application X training data 135 may include application logs of application X 148 along with corresponding labels that identify benign logs and malicious/suspicious logs (see FIG. 2B and corresponding text for further details). Dedicated AIM 140 is trained to detect application-centric cybersecurity threats targeted at application X 148. Application-centric cybersecurity threats are enabled to infect a single one of the application types (e.g., application X 148). For example, application-centric cybersecurity threats may come in the form of unauthorized access or privilege escalation (e.g., where a user has access to a resource is defined at application level and is specific to a particular application). In addition, various vulnerabilities exist that are specific to a particular application/group of applications and may exploited through various means, such as prompt injection, cross-site scripting, SQL injection, or logic bombs. In some embodiments, pieces of malware may be received that are specifically crafted to take advantage of such vulnerabilities (e.g., zero-day exploits).

In turn, system 100 deploys dedicated AIM 140 to runtime environment 145, where dedicated AIM 140 acts as a "wrapper" around application X 148 to intercept and evaluate requests, outputs, debug logs, and responses to/from application X 148 to identify application-centric cybersecurity threats targeted at application X 148. When an application-centric cybersecurity threat is detected, dedicated AIM 140 may quarantine (e.g., block or otherwise restrict) application X 148, quarantine (e.g., block or otherwise restrict) external entities, or a combination thereof (see FIG. 3 and corresponding text for further details).

Similarly, fine-tuning stage 150 trains generalized AIM 120 using application Y training data 155 (e.g., application-specific training data set Y) to produce dedicated AIM 160. Application Y training data 155 may include application logs of application Y 168 along with corresponding labels. In turn, system 100 deploys dedicated AIM 160 to runtime environment 165, where dedicated AIM 160 acts as a wrapper around application Y 168 to intercept and evaluate requests, outputs, debug logs, and responses to/from application Y 168 to identify application-centric cybersecurity threats targeted to application Y 168. When an application-centric cybersecurity threat is detected, dedicated AIM 160 may quarantine application Y 168, quarantine external entities, or a combination thereof.

Likewise, fine-tuning stage 170 trains generalized AIM 120 using application Z training data 175 (e.g., application-specific training data set Z) to produce dedicated AIM 180. Application Z training data 175 may include application logs of application Z 188 along with corresponding labels. In turn, system 100 deploys dedicated AIM 180 to runtime environment 185, where dedicated AIM 180 acts as a wrapper around application Z 188 to intercept and evaluate requests, outputs, debug logs, and responses to/from application Z 188 to identify application-centric cybersecurity threats targeted at application Z 188. When a cybersecurity threat is detected, dedicated AIM 180 may quarantine application Z 188, quarantine external entities, or a combination thereof.

Figure 2A:
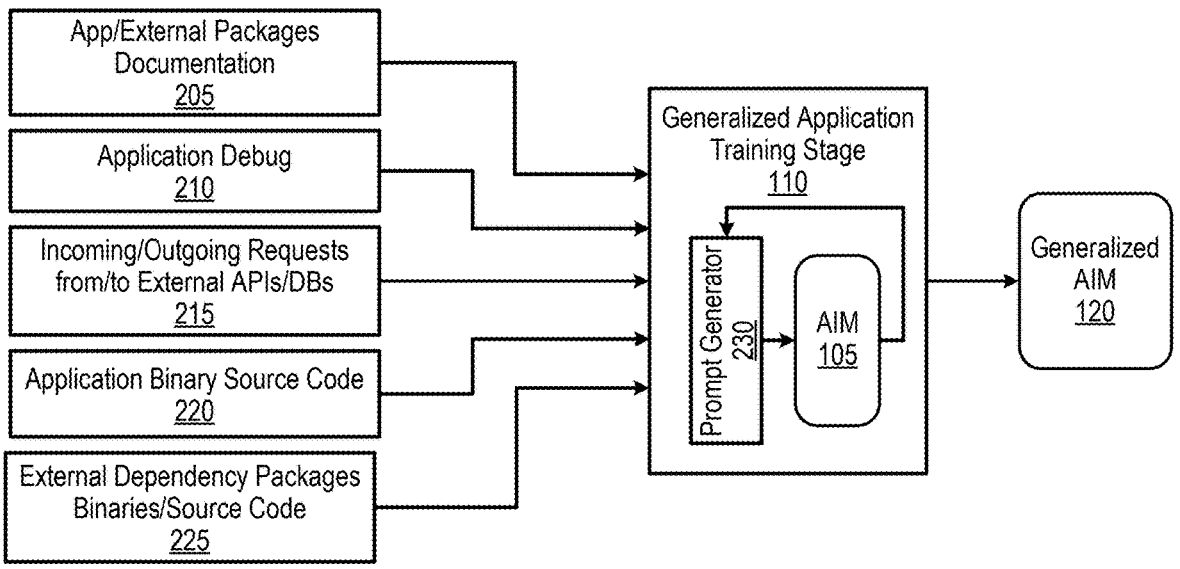
FIG. 2A is a is a block diagram that illustrates an example system for producing a generalized artificial intelligence model (AIM), in accordance with some embodiments of the present disclosure.

FIG. 2A is a is a block diagram that illustrates an example system for producing a generalized AIM, in accordance with some embodiments of the present disclosure.

Generalized application training stage 110 trains AIM 105 to produce generalized AIM 120. Generalized AIM 120 may be considered a general model, or foundation model, which has a context around various applications and has a general understanding about requests, responses, debug signals, and other log data from different types of applications.

Generalized application training stage 110 uses log-collected data corresponding to a plurality of application types. In some embodiments, the training data includes application/external package documentation 205, application debug 210, incoming/outgoing requests from/to external APIs/DBs 215, application binary source code 220, external dependency packages binaries/source code 225, or a combination thereof to train AIM 105 using prompt generator 230. In some embodiments, generalized application training stage 110 performs self-supervised training on AIM 105. Self-supervised training is a technique where an AIM learns from vast amounts of unlabeled data. Through tasks such as language modeling or masked language prediction, AIM 105 predicts missing words in sentences, effectively learning grammar, semantics, and contextual relationships. This unsupervised learning approach creates a foundation for AIM 105's understanding of language, enabling AIM 105 to perform a range of tasks such as text generation, translation, and summarization.

Prompt generator 230 includes information from application/external packages documentation 205 into a prompt for AIM 105 to enable AIM 105 to understand the functionalities, features, and usage patterns of widely-used software libraries and tools. This knowledge empowers AIM 105 to provide accurate explanations, code snippets, and recommendations when developers inquire about integrating external packages.

Prompt generator 230 includes information from application debug 210 into the prompt to provide AIM 105 with insights into real-world software development scenarios, enabling the model to understand common programming errors, code flows, and logical structures. This knowledge equips AIM 105 with the ability to generate helpful suggestions, identify potential bugs, and offer debugging assistance.

Prompt generator 230 includes information from incoming/outgoing requests from/to external APIs/DBs 215 into the prompt to allow AIM 105 to understand the dynamic nature of real-world data exchanges, enabling it to generate contextually relevant prompts and responses that mirror the intricacies of API and database communications. This information also helps AIM 105 to develop a deeper comprehension of API endpoints, data structures, and the nuances of database querying, making it capable of providing accurate code examples and suggestions.

Prompt generator 230 includes information from application binary source code 220 into the prompt to provide AIM 105 with insights into the low-level workings of software, enabling AIM 105 to understand programming structures, algorithms, and optimizations. Additionally, the information can help the AIM 105 gain proficiency in tasks such as code generation, bug detection, and software analysis. Prompt generator 230 includes information from external dependency packages binaries/source code 225 into the prompt for AIM 105 to grasp a wide array of programming paradigms, libraries, and tools commonly used in software development. This familiarity aids AIM 105 in generating accurate code examples, offering suggestions, and providing relevant insights during programming-related tasks.

Prompt generator 230 inputs prompts into AIM 105 using, for example, the above information to iteratively train AIM 105. When generalized application training stage 110 completes to produce generalized AIM 120, generalized AIM 120 has a general understanding about requests, responses, debug signals, and other log data corresponding to different types of applications and is ready to be fine-tuned and produce dedicated AIMs (see FIG. 2B and corresponding text for further details).

Figure 2B:
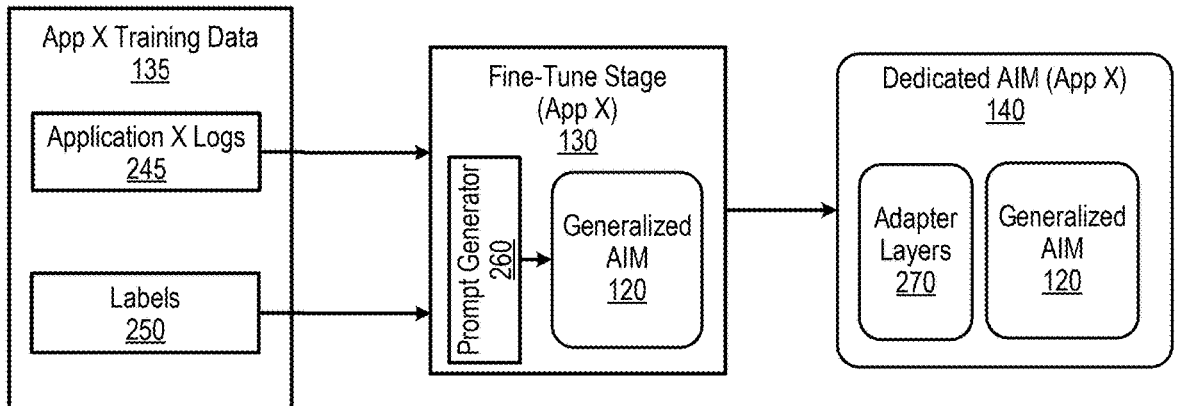
FIG. 2B is a is a block diagram that illustrates an example system for fine-tuning a generalized AIM to produce dedicated AIMs, in accordance with some embodiments of the present disclosure.

FIG. 2B is a is a block diagram that illustrates an example system for fine-tuning a generalized AIM to produce dedicated AIMs, in accordance with some embodiments of the present disclosure.

Fine-tuning stage 130 uses prompt generator 260 to generate prompts that include information from application X logs 245 and labels 250. Fine-tuning stage 130 fine-tunes generalized AIM 120 around the context of application X 148 (or group of similar applications) using various parameter efficient techniques such as adapter layering, low rank adaptation, prefix tuning, prompt tuning, or a combination thereof. In some embodiments, the training is performed in a self-supervised manner or uses various supervision methods either by learning from labeled examples (via labels 250) or by learning to optimize policies. In some embodiments, labels 250 may be generated by classification models that identify which of application X logs 245 are suspicious, malicious, or benign.

In some embodiments, instead of fine-tuning each of the parameters of generalized AIM 120 (e.g., billions of parameters), fine-tuning stage 130 adds and fine-tunes adapter layers 270 (e.g., adapters). As such, when evaluating a prediction from generalized AIM 120 against the corresponding label 250, fine-tuning stage 130 updates the adapter layers 270 instead of updating parameters within generalized AIM 120. In some embodiments, adapter layers 270 may include new matrices that are not included in generalized AIM 120. In some embodiments, fine-tuning stage 130 may train generalized AIM 120 through various other parameter efficient techniques such as low rank adaptation, prefix tuning, prompt tuning, or a combination thereof.

Figure 3:
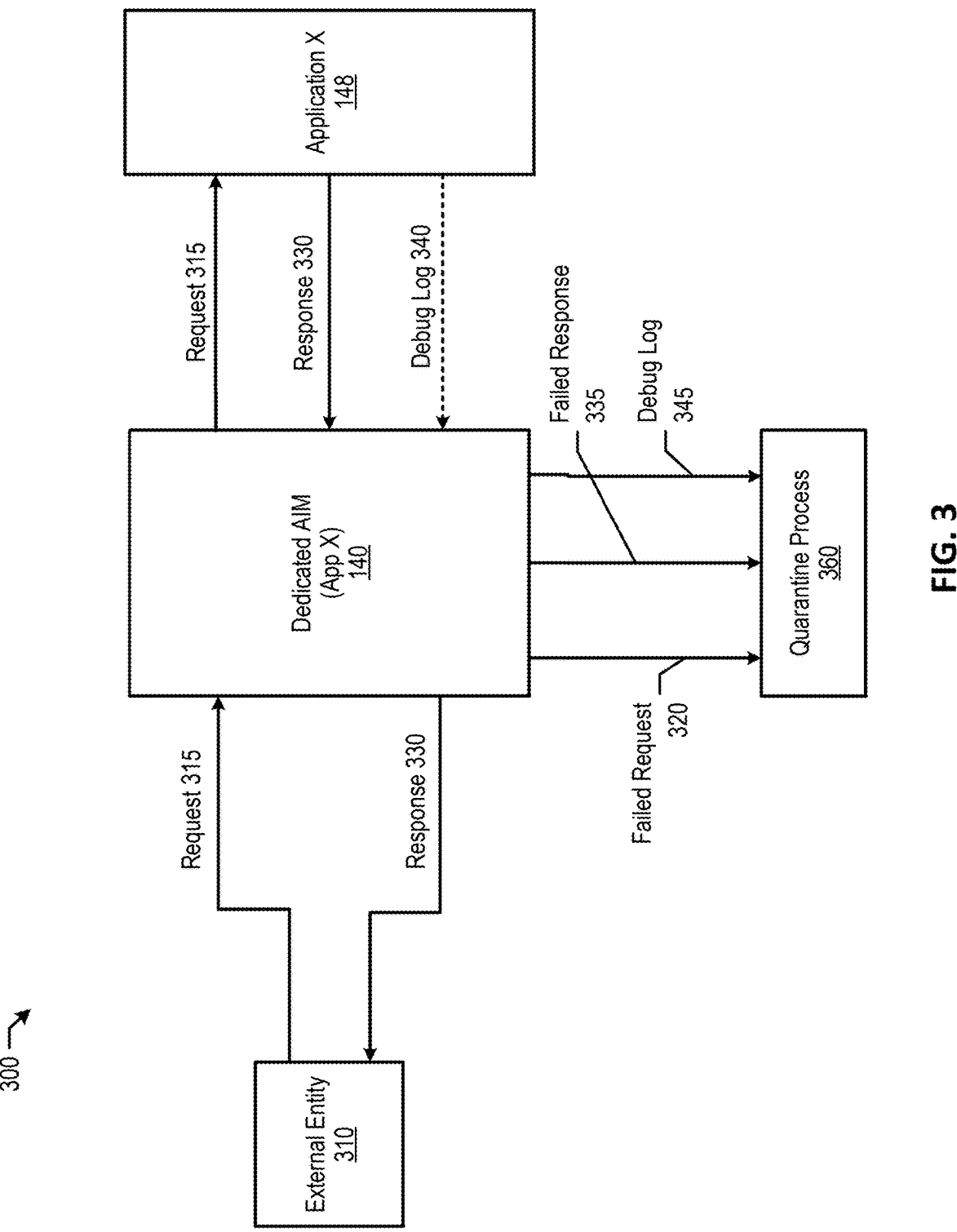
FIG. 3 is a block diagram of a dedicated AIM protecting an application from vulnerabilities, in accordance with some embodiments of the present disclosure.

FIG. 3 is a block diagram of a dedicated AIM protecting an application from vulnerabilities, in accordance with some embodiments of the present disclosure.

System 300 includes dedicated AIM 140, which protects application X 148 from cybersecurity threats by screening requests targeted to application X 148, screens responses generated from application X 148, and screens debug logs generated from application X 148.

Dedicated AIM 140 intercepts request 315 initiated by external entity 310 and determines whether request 315 includes cybersecurity threats, such as suspicious content or malicious content. Suspicious content refers to information that exhibits unusual patterns or behaviors, potentially indicating an anomaly or questionable intent. Suspicious content may not necessarily be explicitly harmful but raises concern due to its deviation from expected norms. Malicious content is designed to exploit vulnerabilities, compromise data, or undermine the security of the system. For example, a malicious actor may use malformed inputs, which are specially crafted data or requests containing unexpected characters, excessively long strings, or incorrect data types. These inputs are designed to trigger buffer overflows, data corruption, or other unintended behaviors within the application's code, potentially leading to a system compromise. Malicious actors may also inject malicious code, such as SQL injection or cross-site scripting (XSS).

In addition, a malicious actor may initiate a zero-day attack, which is a cyberattack that exploits a previously unknown vulnerability in software, hardware, or a digital system. These vulnerabilities are called "zero-day" vulnerabilities because developers and security experts have had zero days to address or fix them before attackers exploit the vulnerabilities. Zero-day vulnerabilities can be particularly dangerous because they allow attackers to gain unauthorized access, compromise systems, and steal sensitive information without being detected or thwarted by existing security measures. Since the vulnerability is unknown, there are typically no patches or updates available to protect against these attacks, making them a significant challenge for organizations to defend against.

When dedicated AIM 140 detects a cybersecurity threat in request 315, dedicated AIM 140 sends failed request 320 to quarantine process 360. Quarantine process 360 may then identify and quarantine external entity 310, thereby blocking or restricting access to external entity 310. For example, quarantine process 360 may add an identifier of external entity 310 to a malicious actor list to automatically block, or otherwise restrict, future requests from external entity 310.

When dedicated AIM 140 determines that request 315 is devoid of a cybersecurity threat, dedicated AIM 140 forwards request 315 to application X 148. Application X 148 produces response 330 based on request 315. In some embodiments, application X 148 may also produce debug log 340 if errors or abnormal activity occurred while processing request 315. Dedicated AIM 140 evaluates response 330 and, if no cybersecurity threat is present, dedicated AIM 140 forwards response 330 to external entity 310 (or another destination entity). However, if dedicated AIM 140 determines that response 330 includes a cybersecurity threat, dedicated AIM 140 sends failed response 335 to quarantine process 360. Quarantine process 360 may quarantine external entity 310 and may also quarantine application X 148 because, for example, application X 148 may include obfuscated malicious code that requires evaluation.

When dedicated AIM 140 receives debug log 340, dedicated AIM 140 determines whether debug log 340 indicates a cybersecurity threat in application X 148, even if response 330 passes evaluation. If so, dedicated AIM 140 sends debug log 345 to quarantine process 360 and may also send failed response 335 to quarantine process 360. Quarantine process 360 may quarantine external entity 310 and may also quarantine application X 148 because, for example, application X 148 may include obfuscated malicious code that requires evaluation that was triggered from request 315.

FIG. 4 is a flow diagram of a method for performing a two-stage training operation on an AIM to produce dedicated AIMs, in accordance with some embodiments of the present disclosure.

Method 400 may be performed by processing logic that may include hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 400 may be performed by generalized application training stage 110, fine-tuning stage 130, dedicated AIM 140, processing device 510 (shown in FIG. 5), processing device 602 (shown in FIG. 6), or a combination thereof.

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

With reference to FIG. 4, method 400 begins at block 410, wherein processing logic trains an artificial intelligence model (AIM) using training data to produce a generalized AIM. training data includes log-collected data corresponding to a plurality of application types and the generalized AIM is trained to detect one or more cross-platform cybersecurity threats. In some embodiments, processing logic generates a prompt comprising the first training data and provides the prompt to the AIM, which performs self-supervised training on the AIM to produce the generalized AIM (see FIG. 2A and corresponding text for further details).

At block 420, processing logic identifies a plurality of application-specific training data sets. Each one of the plurality of application-specific training data sets includes labeled application logs corresponding to one application type from the plurality of application types, possibly excluding logs from other application types from the plurality of application types.

At block 430, processing logic fine-tunes the generalized AIM using the plurality of application-specific training data sets to produce a plurality of dedicated AIMs. Each one of the dedicated AIMs from the plurality of dedicated AIMs is trained to detect one or more application-centric cybersecurity threats targeted at a corresponding one of the plurality of application types.

FIG. 5 is a is a block diagram that illustrates an example system for performing a two-stage training operation on an AIM to produce dedicated AIMs, in accordance with some embodiments of the present disclosure.

Computer system 500 includes processing device 510 and memory 515. Memory 515 stores instructions 520 that are executed by processing device 510. Instructions 520, when executed by processing device 510, cause processing device 510 to train artificial intelligence model (AIM) 540 using training data 530 to produce generalized AIM 550. Training data 530 corresponds to log-collected data corresponding to a plurality of application types and the generalized AIM 550 is trained to detect one or more cross-platform cybersecurity threats.

Processing device 510 identifies application-specific training data sets corresponding to multiple application types. Each set in the multiple application-specific training data sets includes labeled application logs corresponding to one application type from the multiple application types. Processing device then fine-tunes generalized AIM 550 using application-specific training data sets 560 to produce multiple dedicated AIMs 570. Each one of the multiple dedicated AIMs 570 is trained to detect application-centric cybersecurity threats targeted at their corresponding application type, in some embodiments, to the exclusion of threats targeted at other application types.

Figure 6:
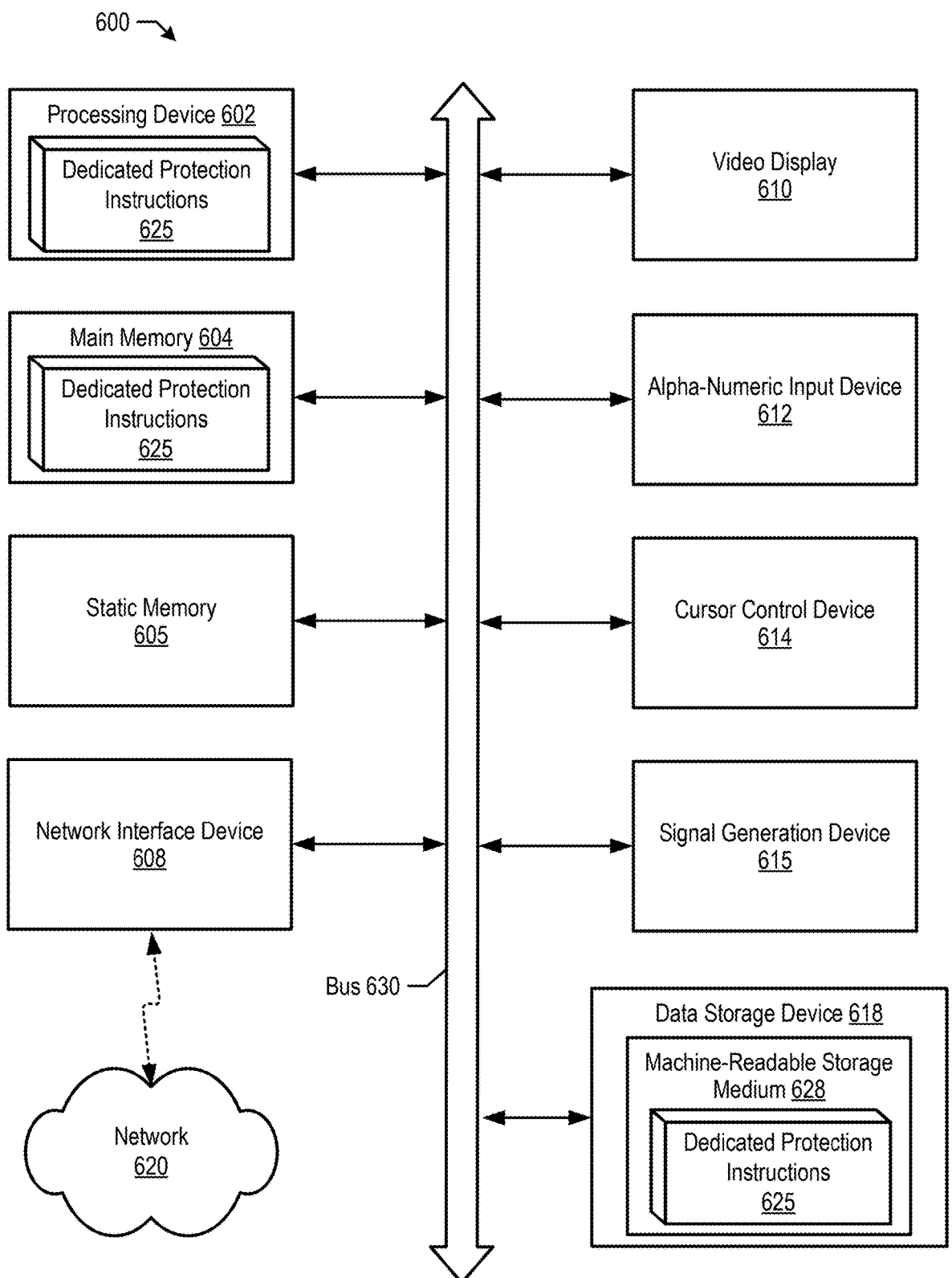
FIG. 6 illustrates a diagrammatic representation of a machine in the example form of a computer system 600 within which a set of instructions, for causing the machine to perform any one or more of the methodologies discussed herein for intelligently scheduling containers.

FIG. 6 illustrates a diagrammatic representation of a machine in the example form of a computer system 600 within which a set of instructions, for causing the machine to perform any one or more of the methodologies discussed herein for intelligently scheduling containers.

In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In some embodiments, computer system 600 may be representative of a server.

The computer system 600 includes a processing device 602, a main memory 604 (e.g., read-only memory (ROM), flash memory, dynamic random access memory (DRAM), a static memory 606 (e.g., flash memory, static random access memory (SRAM), etc.), and a data storage device 618 which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computer system 600 may further include a network interface device 608 which may communicate with a network 620. Computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In some embodiments, video display unit 610, alphanumeric input device 612, and cursor control device 614 may be combined into a single component or device (e.g., an LCD touch screen).

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute dedicated protection instructions 625, for performing the operations and steps discussed herein.

The data storage device 618 may include a machine-readable storage medium 628, on which is stored one or more sets of dedicated protection instructions 625 (e.g., software) embodying any one or more of the methodologies of functions described herein. The dedicated protection instructions 625 may also reside, completely or at least partially, within the main memory 604 or within the processing device 602 during execution thereof by the computer system 600; the main memory 604 and the processing device 602 also constituting machine-readable storage media. The dedicated protection instructions 625 may further be transmitted or received over a network 620 via the network interface device 608.

The machine-readable storage medium 628 may also be used to store instructions to perform a method for intelligently scheduling containers, as described herein. While the machine-readable storage medium 628 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Unless specifically stated otherwise, terms such as "training," "fine-tuning," "determining," "quarantining," "intercepting," "forwarding," "receiving," "detecting," "performing," "adding," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a," "an" and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. § 112(f) for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the present disclosure to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the present disclosure is not to be limited to the details given herein, but may be modified within the scope and equivalents of the appended claims.

What is claimed is:

1. A method comprising:

training an artificial intelligence model (AIM) using training data to produce a generalized AIM, wherein the training data comprises log-collected data corresponding to a plurality of application types and the generalized AIM is trained to detect one or more cross-platform cybersecurity threats, the plurality of application types comprising a first application type;

identifying a plurality of application-specific training data sets, wherein each one of the plurality of application-specific training data sets comprises labeled application logs corresponding to one application type from the plurality of application types;

fine-tuning, by a processing device, the generalized AIM using the plurality of application-specific training data sets to produce a plurality of dedicated AIMs, wherein the plurality of dedicated AIMs comprise a first dedicated AIM that corresponds to the first application type, and wherein each one of the dedicated AIMs from the plurality of dedicated AIMs is trained to detect one or more application-centric cybersecurity threats targeted at a corresponding one of the plurality of application types;

intercepting a request targeted to a first application from an external entity, wherein the first application is the first application type;

determining, by the first dedicated AIM, whether the request indicates at least one of the one or more application-centric cybersecurity threats; and quarantining the external entity responsive to determining that the request indicates at least one of the one or more application-centric cybersecurity threats.

2. The method of claim 1, wherein, in response to determining that the request is devoid of the one or more application-centric cybersecurity threats, the method further comprises:

forwarding the request to the first application;

intercepting a response from the first application that is responding to the request;

determining, by the first dedicated AIM, whether the response indicates at least one of the one or more application-centric cybersecurity threats; and quarantining the external entity and the first application in response to determining that the response indicates at least one of the one or more application-centric cybersecurity threats.

3. The method of claim 1, wherein, in response to determining that the request is devoid of the one or more application-centric cybersecurity threats, the method further comprises:

forwarding the request to the first application;

receiving a debug log from the first application responsive to forwarding the request to the first application;

determining, by the first dedicated AIM, whether the debug log indicates at least one of the one or more application-centric cybersecurity threats; and quarantining the external entity and the first application in response to determining that the debug log indicates at least one of the one or more application-centric cybersecurity threats.

4. The method of claim 1, wherein the plurality of application types comprise a second application type, and the plurality of dedicated AIMs comprise a second dedicated AIM that is trained to detect the one or more application-centric cybersecurity threats targeted at the second application type, and wherein the first dedicated AIM is not trained to detect the one or more application-centric cybersecurity threats targeted at the second application type.

5. The method of claim 1, wherein the one or more cross-platform cybersecurity threats are enabled to infect at least two of the plurality of application types; and each one of the one or more application-centric cybersecurity threats are enabled to infect a single one of the plurality of application types.

6. The method of claim 1, wherein the fine-tuning of the generalized AIM further comprises:

generating a prompt comprising a first application-specific training data set from the plurality of application-specific training data sets; and responsive to inputting the prompt into the generalized AIM, adding one or more layers to the generalized AIM to produce the first dedicated AIM from the plurality of dedicated AIMs.

7. A system comprising:

a processing device; and a memory to store instructions that, when executed by the processing device cause the processing device to:

train an artificial intelligence model (AIM) using training data to produce a generalized AIM, wherein the training data comprises log-collected data corresponding to a plurality of application types and the generalized AIM is trained to detect one or more cross-platform cybersecurity threats, the plurality of application types comprising a first application type;

identify a plurality of application-specific training data sets, wherein each one of the plurality of application-specific training data sets comprises labeled application logs corresponding to one application type from the plurality of application types;

fine-tune the generalized AIM using the plurality of application-specific training data sets to produce a plurality of dedicated AIMs, wherein the plurality of dedicated AIMs comprise a first dedicated AIM that corresponds to the first application type, and wherein each one of the dedicated AIMs from the plurality of dedicated AIMs is trained to detect one or more application-centric cybersecurity threats targeted at a corresponding one of the plurality of application types;

intercept a request targeted to a first application from an external entity, wherein the first application is the first application type;

determine, by the first dedicated AIM, whether the request indicates at least one of the one or more application-centric cybersecurity threats; and quarantine the external entity responsive to determining that the request indicates at least one of the one or more application-centric cybersecurity threats.

8. The system of claim 7, responsive to the processing device executing the instructions, further causes the system to:

forward the request to the first application;

intercept a response from the first application that is responding to the request;

determine, by the first dedicated AIM, whether the response indicates at least one of the one or more application-centric cybersecurity threats; and quarantine the external entity and the first application in response to determining that the response indicates at least one of the one or more application-centric cybersecurity threats.

9. The system of claim 7, responsive to the processing device executing the instructions, further causes the system to:

forward the request to the first application;

receive a debug log from the first application responsive to forwarding the request to the first application;

determine, by the first dedicated AIM, whether the debug log indicates at least one of the one or more application-centric cybersecurity threats; and quarantine the external entity and the first application in response to determining that the debug log indicates at least one of the one or more application-centric cybersecurity threats.

10. The system of claim 7, wherein the plurality of application types comprise a second application type, and the plurality of dedicated AIMs comprise a second dedicated AIM that is trained to detect the one or more application-centric cybersecurity threats targeted at the second application type, and wherein the first dedicated AIM is not trained to detect the one or more application-centric cybersecurity threats targeted at the second application type.

11. The system of claim 7, wherein the one or more cross-platform cybersecurity threats are enabled to infect at least two of the plurality of application types; and each one of the one or more application-centric cyberse-
curity threats are enabled to infect a single one of the
plurality of application types.

12. The system of claim 7, wherein, responsive to the
processing device executing the instructions, further causes
the system to:

generate a prompt comprising a first application-specific
training data set from the plurality of application-
specific training data sets; and responsive to inputting the prompt into the generalized
AIM, add one or more layers to the generalized AIM to
produce the first dedicated AIM from the plurality of
dedicated AIMs.

13. A non-transitory computer readable medium, having
instructions stored thereon which, when executed by a
processing device, cause the processing device to:

train an artificial intelligence model (AIM) using training
data to produce a generalized AIM, wherein the train-
ing data comprises log-collected data corresponding to
a plurality of application types and the generalized AIM
is trained to detect one or more cross-platform cyber-
security threats, the plurality of application types com-
prising a first application type;

identify a plurality of application-specific training data
sets, wherein each one of the plurality of application-
specific training data sets comprises labeled application
logs corresponding to one application type from the
plurality of application types;

fine-tune, by the processing device, the generalized AIM
using the plurality of application-specific training data
sets to produce a plurality of dedicated AIMs, wherein
the plurality of dedicated AIMs comprise a first dedi-
cated AIM that corresponds to the first application type,
and wherein each one of the dedicated AIMs from the
plurality of dedicated AIMs is trained to detect one or
more application-centric cybersecurity threats targeted
at a corresponding one of the plurality of application
types;

intercept a request targeted to a first application from an
external entity, wherein the first application is the first
application type;

determine, by the first dedicated AIM, whether the request
indicates at least one of the one or more application-
centric cybersecurity threats; and quarantine the external entity responsive to determining
that the request indicates at least one of the one or more
application-centric cybersecurity threats.

14. The non-transitory computer readable medium of
claim 13, wherein the processing device is to:

forward the request to the first application;

intercept a response from the first application that is
responding to the request;

determine, by the first dedicated AIM, whether the
response indicates at least one of the one or more
application-centric cybersecurity threats; and quarantine the external entity and the first application in
response to determining that the response indicates at
least one of the one or more application-centric cyber-
security threats.

15. The non-transitory computer readable medium of
claim 13, wherein the processing device is to:

forward the request to the first application;

receive a debug log from the first application responsive
to forwarding the request to the first application;

determine, by the first dedicated AIM, whether the debug
log indicates at least one of the one or more application-
centric cybersecurity threats; and quarantine the external entity and the first application in
response to determining that the debug log indicates at
least one of the one or more application-centric cyber-
security threats.

16. The non-transitory computer readable medium of
claim 14, wherein the plurality of application types comprise
a second application type, and the plurality of dedicated
AIMs comprise a second dedicated AIM that is trained to
detect the one or more application-centric cybersecurity
threats targeted at the second application type, and wherein
the first dedicated AIM is not trained to detect the one or
more application-centric cybersecurity threats targeted at the
second application type.

17. The non-transitory computer readable medium of
claim 13, wherein the processing device is to:

generate a prompt comprising a first application-specific
training data set from the plurality of application-
specific training data sets; and responsive to inputting the prompt into the generalized
AIM, add one or more layers to the generalized AIM to
produce the first dedicated AIM from the plurality of
dedicated AIMs.

* * * * *